Sept. 26, 1950 M. P. ORNSTEIN ET AL 2,523,322
ACCELERATED-WEATHERING DEVICE
Filed May 19, 1947 2 Sheets-Sheet 1
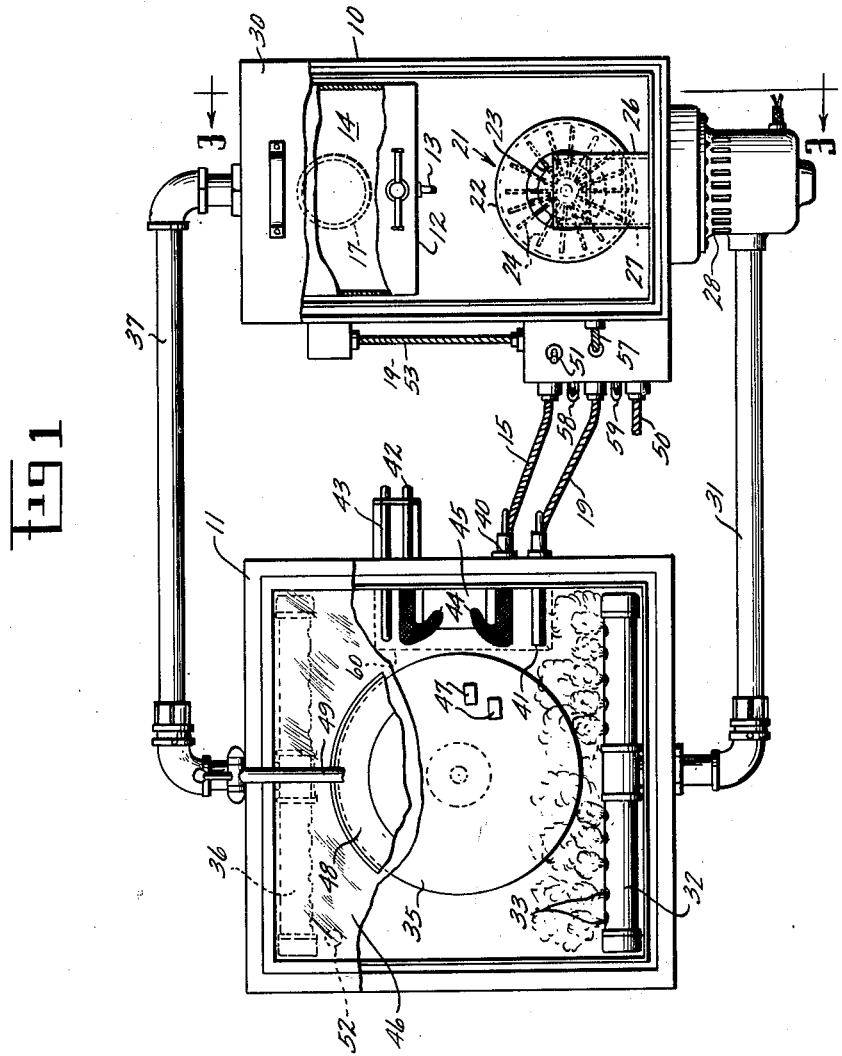
INVENTORS.
MENDEL P. ORNSTEIN
JOHN H. SIEBERT JR.
BY
ATTORNEYS Sept. 26, 1950  M. P. ORNSTEIN ET AL  2,523,322
ACCELERATED-WEATHERING DEVICE
Filed May 19, 1947  2 Sheets-Sheet 2
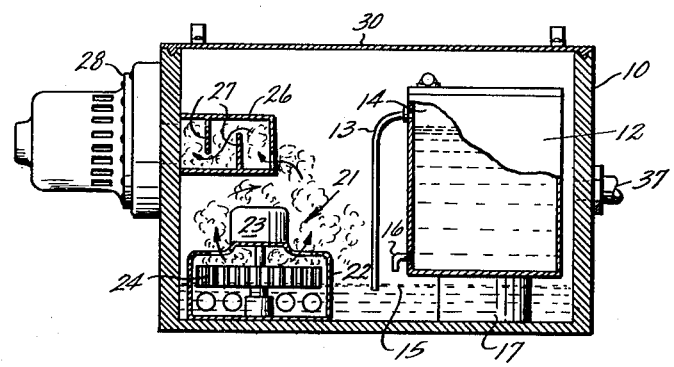
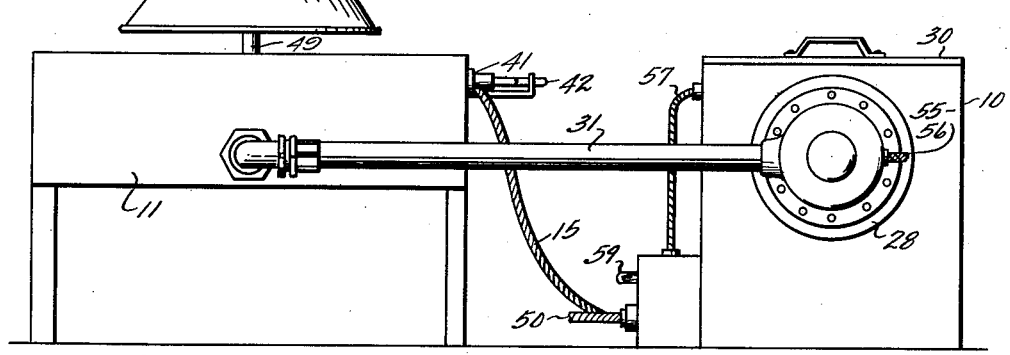
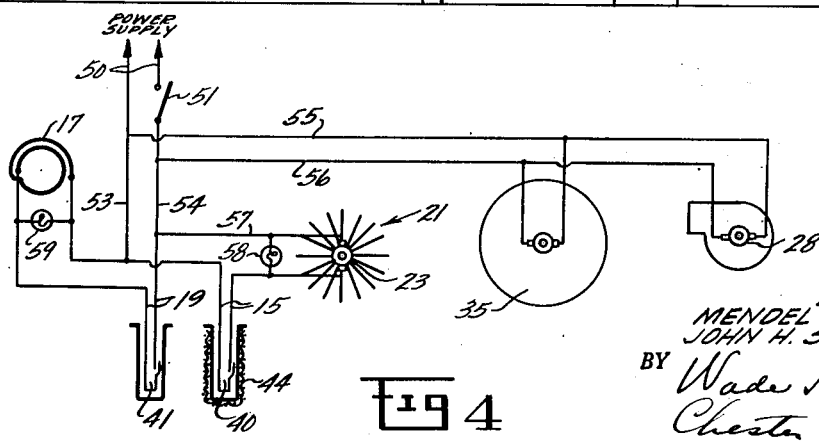
INVENTORS.
MENDEL P. ORNSTEIN
JOHN H. SIEGERT JR.
BY Wade Koonty
Chester Tietig and
ATTORNEYS Patented Sept. 26, 1950

2,523,322

UNITED STATES PATENT OFFICE 2,523,322

ACCELERATED-WEATHERING DEVICE

Mendel P. Ornstein, Dayton, Ohio, and John H. Siebert, Jr., Pittsburgh, Pa.

Application May 19, 1947, Serial No. 749,072

8 Claims. (Cl. 73—15.4)

(Granted under the act of March 3, 1883, as amended April 30, 1928; 370 O. G. 757)

The invention described herein may be manufactured and used by or for the Government for governmental purposes without payment to us of any royalty thereon.

This invention relates to an accelerated-weathering device of the controlled-atmosphere and controlled-irradiation type. It is intended to simulate tropical conditions and is suitable for testing samples of textiles, painted test specimens, other coating compositions, phosphors and the like.

Among the objects of the invention is the provision of a device wherein artificial temperature and humidity conditions are precisely controlled.

Another object is to provide a device in which air is preconditioned in regard to temperature and humidity before being delivered to the chamber in which test specimens are exposed.

Another object is to make provision for the uniform exposure of test specimens to all of the factors of temperature, humidity and ultra-violet light exposure that enter into the test.

Another object is to provide a general arrangement of parts resulting in a compact and efficient apparatus.

In the drawings:

Fig. 1 is a top plan view of the entire apparatus, shown partly in section;

Fig. 2 is a front elevation of the entire apparatus;

Fig. 3 is a sectional elevation of the air conditioning unit taken on the line 3—3 of Fig. 1; and Fig. 4 is a schematic diagram showing the electric circuit by which the apparatus is controlled.

In the drawings, 10 is an air conditioning chamber made preferably of corrosion resistant metal and 11 is an exposure chamber conveniently made of non-corrosive metal or lead covered wood. In the chamber 10 there is a water reservoir 12. To keep the water level 15 in the chamber 10 at a constant level, an air hose 13 connects an air space 14 at the top of the reservoir 12 to a point below the surface of the water. Thus when the water level 15 drops below a predetermined level, air enters the hose 13 and allows an equivalent amount of water to flow from the reservoir 12 through a spigot 16 into the chamber 10.

Beneath the reservoir 12 is an electric immersion heater 17 which may be of the commercial type which contains a resistance wire sealed within an insulated tube and in turn is sealed in a copper tube in a watertight manner. A pair of electric leads 19 (see Fig. 4) connect the heater 17 with a dry thermostat 41 mounted on the wall of the exposure chamber 11 and to a power source 50. In the chamber 10 at the forward end is a vaporizer or spray means 21 comprising a housing 22, a high speed motor 23 and a fan or impeller 24. Directly above the vaporizer 21 is a trap 26 containing a series of baffle plates 27. The trap 26 serves to collect the larger water droplets from the water fog created by the vaporizer 21 before the fog reaches the blower 28. The air conditioning chamber 10 is covered with a self-sealing lid 30.

In the exposure chamber 11 at the forward end, a conduit 32 containing a plurality of holes 33 emits fog and water vapor into the chamber 11 from a conduit 31. The fog then passes over the turntable 35 supporting and rotating specimens 47 which are to be tested. The fog is returned by the action of the fan 28 through the conduit 36 at the rear end of the chamber 11 and the conduit 37 to the air conditioning chamber 10. The exposure chamber 11 contains a pair of wet bulb and dry bulb thermostats 40 and 41 respectively and also a pair of wet and dry bulb thermometers 42 and 43 respectively for visual inspection. The wet bulb thermostat 40 and wet bulb thermometer 42 are inclosed in a wick-like cover 44 and are kept moist by a reservoir 45. The chamber 11 has an ultra-violet-transmitting glass top or lid 46 for visual inspection of the specimens to be tested and is also self-sealing. A source of ultra-violet light 48, which may be any well known type of ultra-violet ray generator can be lowered over the glass top or lid 46 by adjusting the arm 49. Drainage of water from the exposure chamber 11 is provided by an outlet 52. The thermostats and thermometers are protected from direct radiation by a shield 60.

The electric circuit shown in Fig. 4 provides a power source 50 which is controllable by a switch 51. A pair of primary leads 53 and 54 are tapped by secondary leads 55 and 56. In the circuit of the latter, motors for the blower 28 and the turntable 35 are connected in parallel. The motor 23 for vaporizer 21 is connected in parallel by means of leads 57 and 15, the wet-bulb thermostat 40 being connected in series with motor 23. An indicator light 58 is connected across leads 15—57 and serves to tell whether vaporizer 21 is operating. The heater 17 is connected across leads 53—54, the dry bulb thermostat 41 being in series with the heater. An indicator lamp 59 serves to tell whether the heater is operating.

To operate the apparatus, the test specimens 47 are first placed on the turntable 35. Switch 51 is closed, thereby energizing turntable 35, blower 28, vaporizer 21 and heater 17. All of these continue in operation until the proper temperature and humidity have been reached. At the time of reaching sufficient temperature, dry bulb thermostat 41 cuts out the heater 17; at the time of reaching sufficient humidity, wet bulb thermostat 40 cuts out the vaporizer 21. As soon as proper temperature and humidity are reached, the ultra-violet lamp 48 is energized. The time is now noted and the conditions are allowed to prevail for as long a time as is necessary to test the specimens 47.

If the vaporizer 21 or the heater 17 are cut out by the action of their respective thermostats, they will again be energized as soon as the conditions change to an extent sufficient to re-close the thermostats. The range of the thermostats is preferably adjustable.

We claim as our invention:

1. In an accelerated-weathering device, an exposure chamber, a glass top therefor, a generator of ultra-violet rays above said top, a turntable for exposing specimens below said top and said generator, means for directing air across the top of said turntable, means for exhausting air which has passed over said turntable, and means for controlling the condition of said air according to preselected standards of temperature and humidity.

2. In an accelerated-weathering device, an exposure chamber, a wet bulb thermostat and a dry bulb thermostat within said exposure chamber, an air conditioning unit connected with said exposure chamber to circulate conditioned air therethrough, an immersion type heater and a mechanical vaporizer in said air conditioning unit, an electric circuit whereby said dry bulb thermostat is adapted to control said heater and said wet bulb thermostat to control said vaporizer, a blower on said air conditioning unit whereby to deliver conditioned air to said exposure chamber and a trap arranged at the inlet of said blower to rid the air of the larger water particles suspended therein.

3. In an accelerated-weathering device, an exposure chamber, an ultra-violet-transparent waterproof seal for said chamber, a source of ultra-violet light arranged to shine through said seal, a turntable for the exposure and rotation of specimens under said seal and said source of light, means for rotating said turntable, a source of conditioned air, means for delivering air from said source into said chamber and across said turntable under said seal, and regulators comprising wet bulb and dry bulb thermostats operatively connected with the source of said conditioned air to control the temperature and humidity of said air.

4. In an accelerated-weathering device, a generator of conditioned air which comprises a housing, a water reservoir within said housing, an immersion type electric heater in said water, a fog-generator, a motor for driving said fog generator, said fog-generator being arranged to make foggy air from the water heated by said immersion heater, a trap for removing excess water from said foggy air, a blower for moving the foggy air to an adjacent point of use, ducts through which said foggy air may be delivered to and returned from the point of use and temperature and humidity controls located at said point of use whereby the condition of air to be delivered thereto may be regulated at the conditioned air generator.

5. An accelerated weathering device, an exposure chamber for specimens, a conditioning unit for air, conduits for delivering conditioned air to said exposure chamber and for returning air therefrom for reconditioning, control means mounted within the exposure chamber for regulating the air conditioning unit so that the latter will prepare air of predetermined temperature and humidity for delivery to the exposure chamber, an ultra-violet light generator for the exposure chamber and a turntable rotatable in said chamber under said ultra-violet light generator.

6. In an accelerated weathering device, a first exposure chamber, a transparent seal for said chamber, a source of light arranged to shine through said seal onto specimens exposed in said chamber, a second chamber, means in said second chamber for conditioning air in regard to temperature and humidity, a duct for delivering conditioned air therefrom to said first exposure chamber, a duct for exhausting conditioned air from said first exposure chamber to said second chamber, power means connected to at least one of said ducts for creating a circulation of conditioned air through said first exposure chamber and between said first and second chamber through said ducts, a turntable in said first exposure chamber for the exposure of specimens, means for rotating said turntable, the ducts being arranged to pass a distributed current of conditioned air across said turntable to weather the exposed specimens.

7. In an accelerated weathering device, a conditioning unit for air including a water reservoir, an electric immersion type heater immersed in the water therein, a mechanical fog generator for making fog from the water heated by said immersion heater, an exposure chamber for the exposure of specimens to weathering, conduits for delivering conditioned air to said exposure chamber and for returning air therefrom to the conditioning unit for reconditioning, control means for said air conditioning unit said control means being located within said exposure chamber and including an electric circuit to said air conditioning unit, and also including a pair of wet and dry bulb thermostats mounted in the exposure chamber, a blower in said air conditioning unit for delivering conditioned air into the exposure chamber, an ultra-violet light generator adapted to deliver ultra-violet radiation into the exposure chamber, a gas-tight partition over said exposure chamber adapted to pass a substantial amount of ultra-violet radiation into the chamber, a turntable in said exposure chamber adapted for the exposure of specimens thereon, said turntable being located in the path of the conditioned air, and means for rotating said turntable to expose objects on said turntable to said radiation and to the stream of conditioned air.

8. An accelerated weathering device for exposing specimens to conditions of temperature, humidity and light simulating tropical climatic conditions, comprising a specimen treatment chamber, a window in said chamber permeable to ultraviolet light, an ultra violet light generator for irradiating the interior of the treatment chamber through said window, an inlet conduit for delivering conditioned air to said treatment chamber and an exhaust conduit for discharging air from said treatment chamber, an air conditioning chamber communicating with both of said conduits, a blower in series with one of said conduits for maintaining a continuous circulation of air between said chambers, said air conditioning chamber having means forming a reservoir of water to provide a substantial upper surface area in surface heat exchange contact with the air blowing through said conditioning chamber, means to heat the water in the reservoir in response to variation in treatment chamber temperature to control the temperature of the conditioned air delivered to the treatment chamber, spray means including a motor driven impeller in contact with said reservoir of water in said air conditioning chamber for spraying water from said reservoir in fine droplets into the air in the conditioning chamber and means responsive to humidity variations in said treatment chamber for regulating said spray means to control the humidity of the air delivered to said treatment chamber.

MENDEL P. ORNSTEIN.
JOHN H. SIEBERT, Jr.

REFERENCES CITED

The following references are of record in the file of this patent:

UNITED STATES PATENTS

| Number | Name | Date |
|---|---|---|
| 1,955,518 | Sherwood | Apr. 17, 1934 |
| 1,969,606 | Hall | Aug. 7, 1934 |
| 2,156,162 | Pfening et al. | Apr. 25, 1939 |
| 2,201,389 | De Give | May 21, 1940 |
| 2,243,999 | Chapple | June 3, 1941 |
| 2,419,119 | Christensen | Apr. 15, 1947 |